(12) United States Patent  
Cook

(10) Patent No.: US 6,840,755 B1  
(45) Date of Patent: Jan. 11, 2005

(54) STAKING APPARATUS

(76) Inventor: Lawrence J. Cook, 2541 Miller Rd., Metamora, MI (US) 48455

( * ) Notice: Subject to any disclaimer, the term of this patent is extended or adjusted under 35 U.S.C. 154(b) by 225 days.

(21) Appl. No.: 10/098,965

(22) Filed: Mar. 15, 2002

(51) Int. Cl.$^7$ ................................................ B29C 43/18
(52) U.S. Cl. ........................ 425/508; 425/392; 425/112
(58) Field of Search ................................ 425/508, 392, 425/112; 264/249

(56) References Cited

U.S. PATENT DOCUMENTS

| | | | |
|---|---|---|---|
| 4,633,559 A | | 1/1987 | Loren .......................... 29/243.5 |
| 4,767,298 A | | 8/1988 | Bocchicchio et al. ........ 425/112 |
| 5,018,957 A | * | 5/1991 | Assink et al. ................ 425/143 |
| 5,095,606 A | | 3/1992 | Barrick .......................... 29/509 |
| 5,187,863 A | | 2/1993 | Wittens ........................ 29/845 |
| 5,227,173 A | | 7/1993 | Sherwood .................... 425/143 |
| 5,308,427 A | | 5/1994 | Duhaime et al. ............ 156/245 |
| 5,423,938 A | | 6/1995 | Hofius, Sr. et al. ......... 156/497 |
| 5,871,784 A | * | 2/1999 | Assink et al. ................ 425/383 |
| 6,093,277 A | | 7/2000 | Assink et al. ................ 156/292 |
| 6,099,291 A | | 8/2000 | Lanser .......................... 425/508 |
| 6,296,470 B1 | | 10/2001 | Lanser et al. ............... 425/508 |

FOREIGN PATENT DOCUMENTS

GB    2367263 A  *  4/2002

OTHER PUBLICATIONS

JR Automation Technologies webpage; dated Apr. 2001.*

* cited by examiner

*Primary Examiner*—Blaine Copenheaver
*Assistant Examiner*—Barbara J Musser
(74) *Attorney, Agent, or Firm*—Honigman Miller Schwartz and Cohn

(57) ABSTRACT

A staking apparatus is provided for use in assembling two or more workpieces, wherein one of the workpieces is made from a thermally softenable and pressure deformable material. The staking apparatus includes a first end plate, an intermediate plate aligned with and spaced apart from the first end plate and a first extensible member disposed therebetween. A second end plate is provided that is extensible in relation to the intermediate plate by the first extensible member. A vent tube, which supplies a flow of air unto the workpiece, and a second extensible member are secured for movement with the second end plate. A staking tool is mounted to the second extensible member and is extensible between a working position, wherein a portion of the thermally softenable workpiece is deformed, and a storage position. A method of operating the staking apparatus is also disclosed.

18 Claims, 8 Drawing Sheets

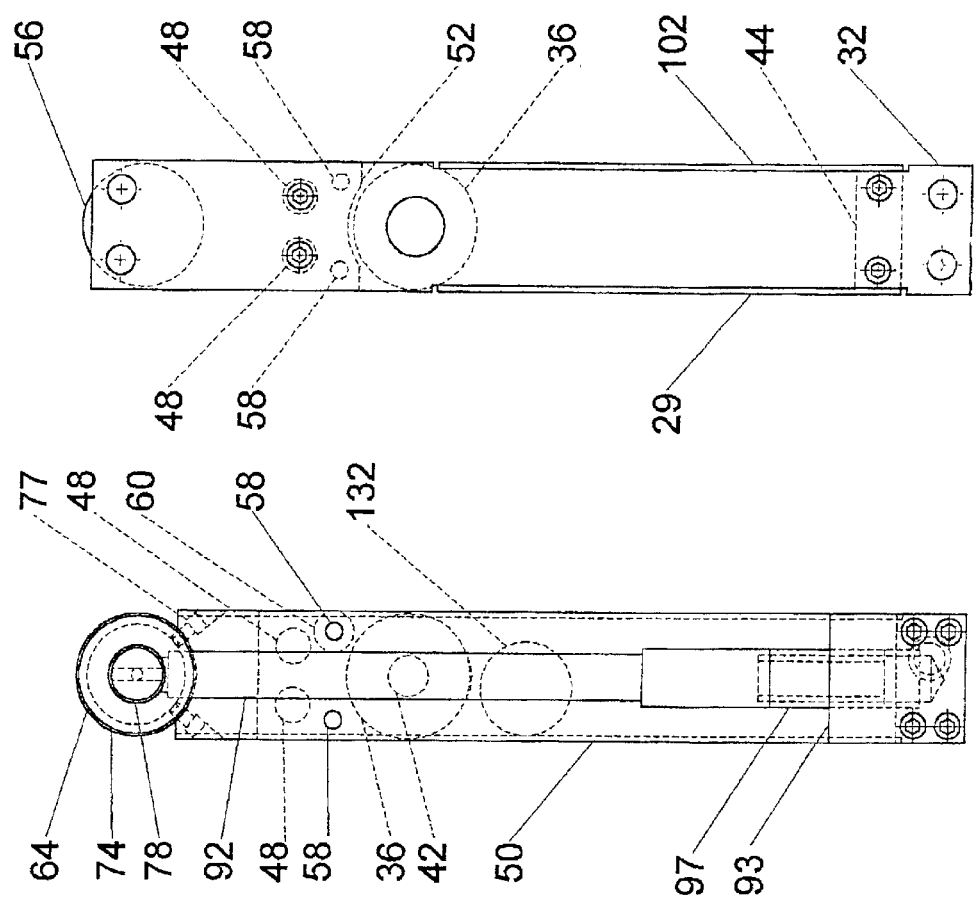

US 6,840,755 B1

STAKING APPARATUS

BACKGROUND OF THE INVENTION

1. Field of the Invention

The present invention relates generally to a heat staking apparatus for joining two or more workpieces and, more particularly, to a compact, self-controlled staking apparatus for joining two or more workpieces.

2. Description of the Related Art

Heat staking is a well-known process for permanently joining two or more of parts at one or more discrete locations. In the heat staking process, one of the joined parts includes a short thermoplastic post or stud that is inserted through a hole or aperture in the mating part. The stud is heated until it is plastically deformable and then shaped or otherwise deformed by a suitable staking tool to form a rivet-like end on the stud that secures the mating parts together.

Known heat staking machines, such as the machine disclosed in U.S. Pat. No. 6,093,277, are configured to repetitively assemble a single article or a family of articles. Known heat staking machines are relatively large and typically employ one or more staking tools assembled on a support structure and a separate control system to facilitate heating of the staking tool prior to deforming the stud. To reconfigure or "retool" these machines, each individual staking tool must be disassembled from the control system and rearranged or removed from the heat staking machine. Additionally, known staking machines typically employ a single control system for several heat staking tools, which idles all the staking tools when the control system is rendered inoperable. Accordingly, there exists a need for a compact, self-controlled staking apparatus that can be readily configurable, either alone or in combination with several similar staking apparatus, to assemble a single article or a family of articles.

SUMMARY OF THE INVENTION

A staking apparatus is provided for use in assembling two or more workpieces, wherein one of the workpieces is made from a thermally softenable and pressure deformable material. The staking apparatus includes a first end plate, an intermediate plate aligned with and spaced apart from the first end plate and a first extensible member disposed therebetween. A second end plate is provided that is extensible in relation to the intermediate plate by the first extensible member. A vent tube, which supplies a flow of air unto the workpiece, and a second extensible member are secured for movement with the second end plate. A staking tool is mounted to the second extensible member and is extensible between a working position, wherein a portion of the thermally softenable workpiece is deformed, and a storage position. A control system, for controlling operation of the staking apparatus, is preferably provided substantially between the first end plate and intermediate plate, giving the staking apparatus a compact package. A method of operating the staking apparatus is also disclosed.

Among other advantages, the inventive staking apparatus is compact and readily configurable with similarly designed staking apparatus to repetitively assemble a single article or family of articles. Another advantage is that the staking apparatus includes its own control system, allowing it to remain operable when cooperating staking apparatus are rendered inoperable.

Various additional aspects and advantages of this invention will become apparent to those skilled in the art from the following detailed description of the preferred embodiment, when read in light of the accompanying drawings.

BRIEF DESCRIPTION OF THE DRAWINGS

The features and inventive aspects of the present invention will become more apparent upon reading the following detailed description, claims, and drawings, of which the following is a brief description:

FIG. 6 is a first end view of the staking apparatus of FIG. 4.

FIG. 7 is a second end view of the staking apparatus of FIG. 4.

DESCRIPTION OF THE PREFERRED EMBODIMENT

Figure 1:
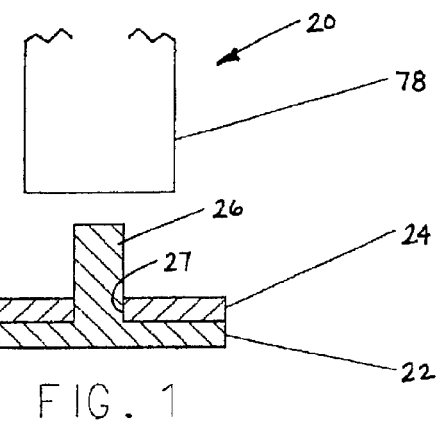
FIG. 1 is a partial cross-sectional view showing a pair of workpieces and a vent tube prior to being secured together.
Figure 2:
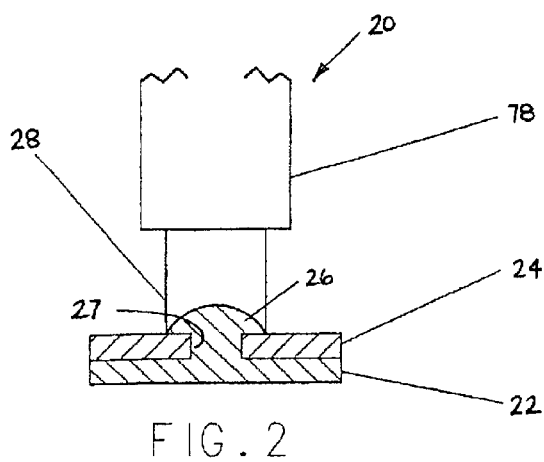
FIG. 2 is a partial cross-sectional view showing the two workpieces of FIG. 1 being secured together by deforming a stud on one workpiece with a staking tool.
Figure 3:
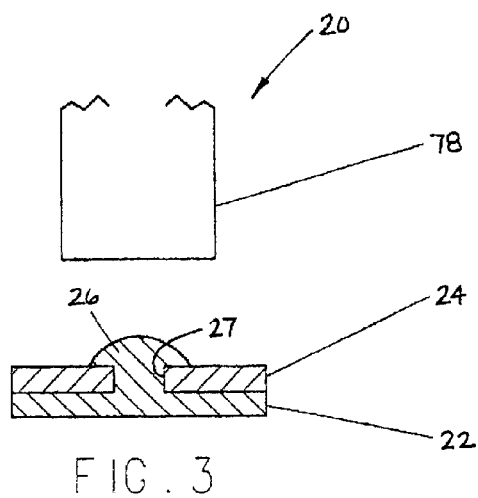
FIG. 3 is a partial cross-sectional view showing the two workpieces of FIG. 1 secured together.

Referring now to the drawings, the preferred embodiments of the present invention are shown in detail. Referring to FIG. 1, a staking apparatus 20 according to a preferred embodiment of the present invention is shown positioned above first and second workpieces 22 and 24, respectively, which are to be joined together. As is well known in the art, a stud 26 made from a thermally softenable and pressure deformable material, such as ABS plastic, projects upwardly from first workpiece 22 and passes through a hole 18 formed in second workpiece 24. As illustrated in FIGS. 2 and 3, stud 26 is deformed by a staking tool 28 to fasten first and second workpieces 22, 24 together, as will be described in further detail below.

Figure 4:
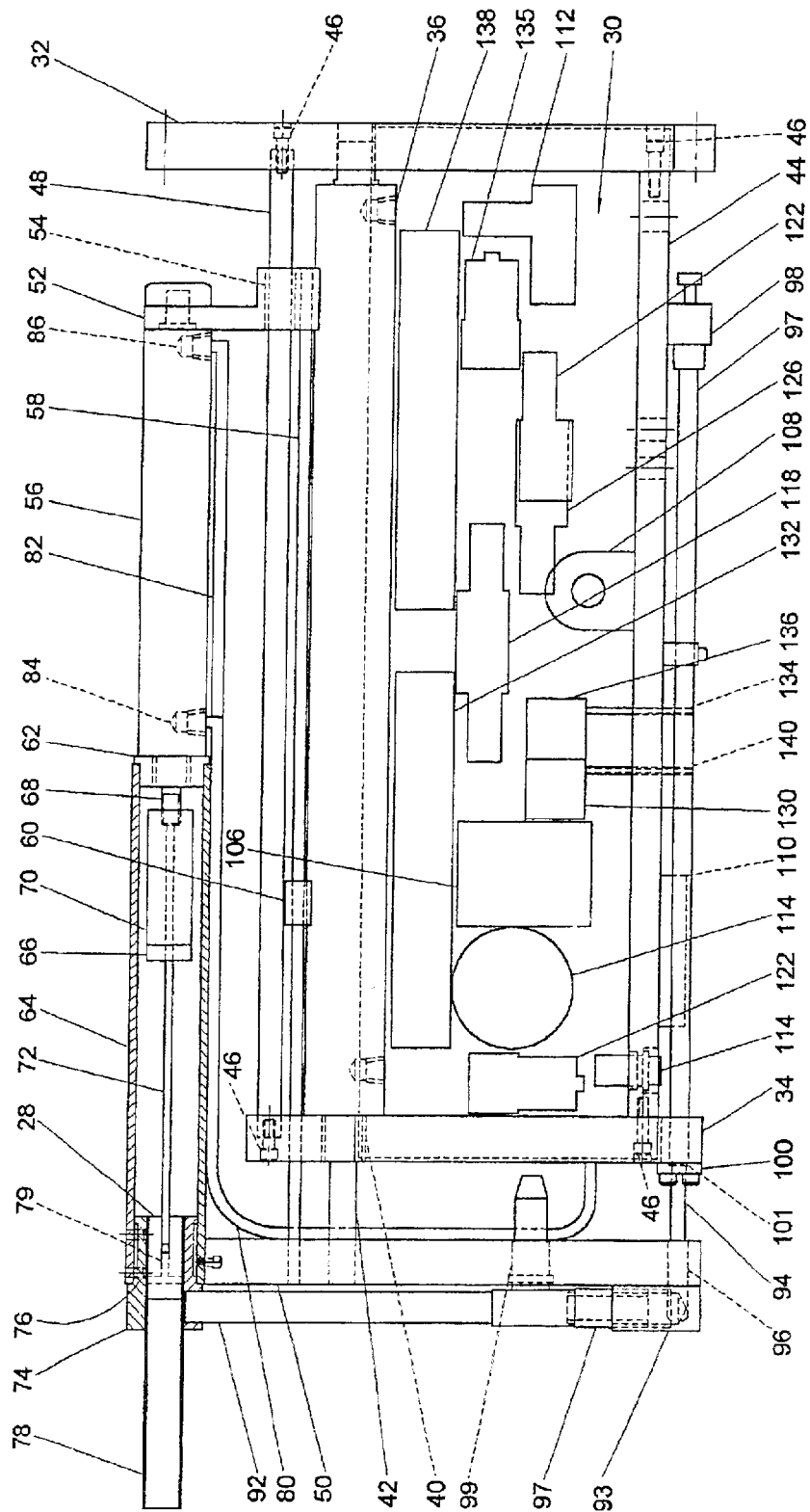
FIG. 4 is a plan view of a staking apparatus, according to a preferred embodiment of the present invention, with a cover removed for clarity.

A plan view of staking apparatus 20 is illustrated in FIG. 4 with a cover 29 removed to view a control system 30 for controlling operation of staking apparatus 20. Staking apparatus 20 includes a first end plate 32 and an intermediate plate 34 substantially aligned with and spaced apart from first end plate 32. A first extensible member 36, such as a pneumatic cylinder, is supported between first end plate 32 and intermediate plate 34. First extensible member 36 is supported in a hole 38 in first end plate 32. Intermediate plate 34 includes a hole 40 therethrough that allows passage of a rod 42 that extends from and retracts into first extensible member 36, as will be describe in detail below. A side plate 44 is attached to first end plate 32 and intermediate plate 34 by fasteners 46, such as a bolt or the like. At least one support shaft 48 is also attached to first end plate 32 and intermediate plate 34 by fasteners 46.

A second end plate 50 is provided adjacent intermediate plate 34 and is extensible in relation to intermediate plate 34 by first extensible member 36. A support arm 52 having at least one bearing member 54 is slidably received over support shaft 48. Bearing member 54 is preferably an oil-impregnated sleeve bearing that is press-fit into support arm 52. A second extensible member 56 is supported between support arm 52 and second end plate 50 and is fixed for travel therewith. At least one tie rod 58 extends freely through intermediate plate 34 and is fixedly attached to support arm 52 and second end plate 50. An axially adjustable collar 60 is attached to tie rod 58 and abuts intermediate plate 34 as support arm 52 slides toward intermediate plate 34 to limit the travel of second end plate 50.

An adapter 62 is attached to second extensible member 56 and is used to secure a tube 64, which is shown in cross section in FIG. 4, to second extensible member 56. A rod 68 extends from second extensible member 56 and is configured to receive a coupler 70. Coupler 70 is preferably threaded onto the end of rod 68 and is attached with a fastener (not illustrated), such as a set-screw or the like. A push rod 72 is secured on one end to coupler 70 and on the other end to staking tool 28. Push rod 72 may be adjusted axially within coupler 70 to increase or decrease the length of push rod 72 if desired.

A generally cylindrical sleeve 74 is secured within tube 64 by at least one fastener 76, such as a set-screw or the like. Second end plate 50 is secured to tube 64 by at least one fastener 77, as best shown in FIG. 6. A vent tube 78, which is shown in cross section in FIG. 4, is preferably secured to sleeve 74 by a press fit connection. Staking tool 28 is extensible between a stored position, wherein tool 28 resides substantially within sleeve 74, and a working position (FIG. 9), wherein tool 28 extends at least partially outward of vent tube 78. A sealing member 66 is preferably provided on coupler 70 and abuts sleeve 74 when tool 28 is in the working position to substantially prevent airflow in a direction toward second extensible member 56.

When second extensible member 56 functions as a pneumatic cylinder, a pair of flexible conduits 80 and 82, such as a hose, are provided between intermediate plate 34 and first and second ports 84 and 86, respectively, of second extensible member 56. Although not illustrated in FIG. 4, each conduit 80 and 82 is provided in sealed communication with control system 30.

A heater 92 is indirectly connected to second end plate 50 by at least one support member 93 and is placed in communication with vent tube 78 through a hole in sleeve 74. Heater 92 is also place in communication with a tube 94 that is attached to second end plate 50 via a duct 96 in second end plate 50 and a duct 97 in support member 93. Tube 94 extends through a larger diameter tube 96 that is attached on one end to intermediate plate 34 and on the other end to a flow control valve 98. Tube 94 extends through a sealing plate 100 that is secured to intermediate plate 34. Sealing plate 100 generally includes a sealing member (not illustrated), such as an o-ring, which seals against tube 94 and allows tube 94 to extend into and out of tube 96. Heater 92 is also provided with an electrical coupling 99 that extends through second end plate 50. An electrical conduit, such as a wire (not illustrated), extends between electrical coupling 99 and control system 30 to supply electricity to heater 92 during operation.

Figure 5:
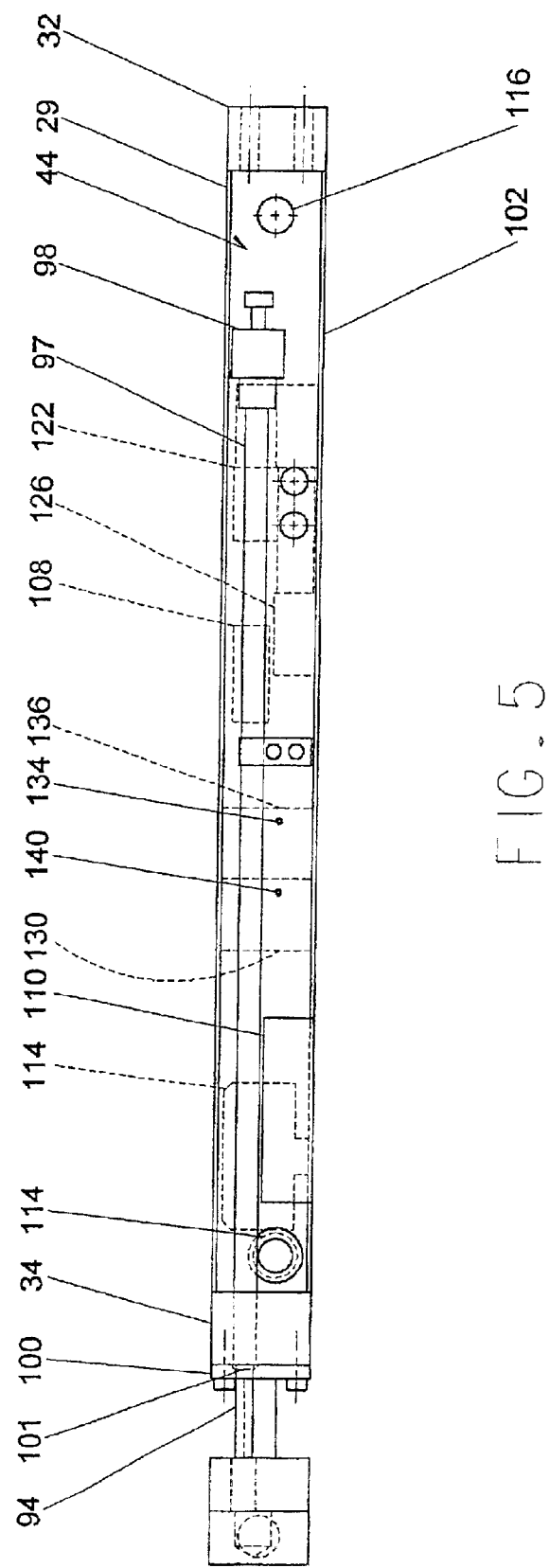
FIG. 5 is a side view of the staking apparatus of FIG. 4.
Figure 11:
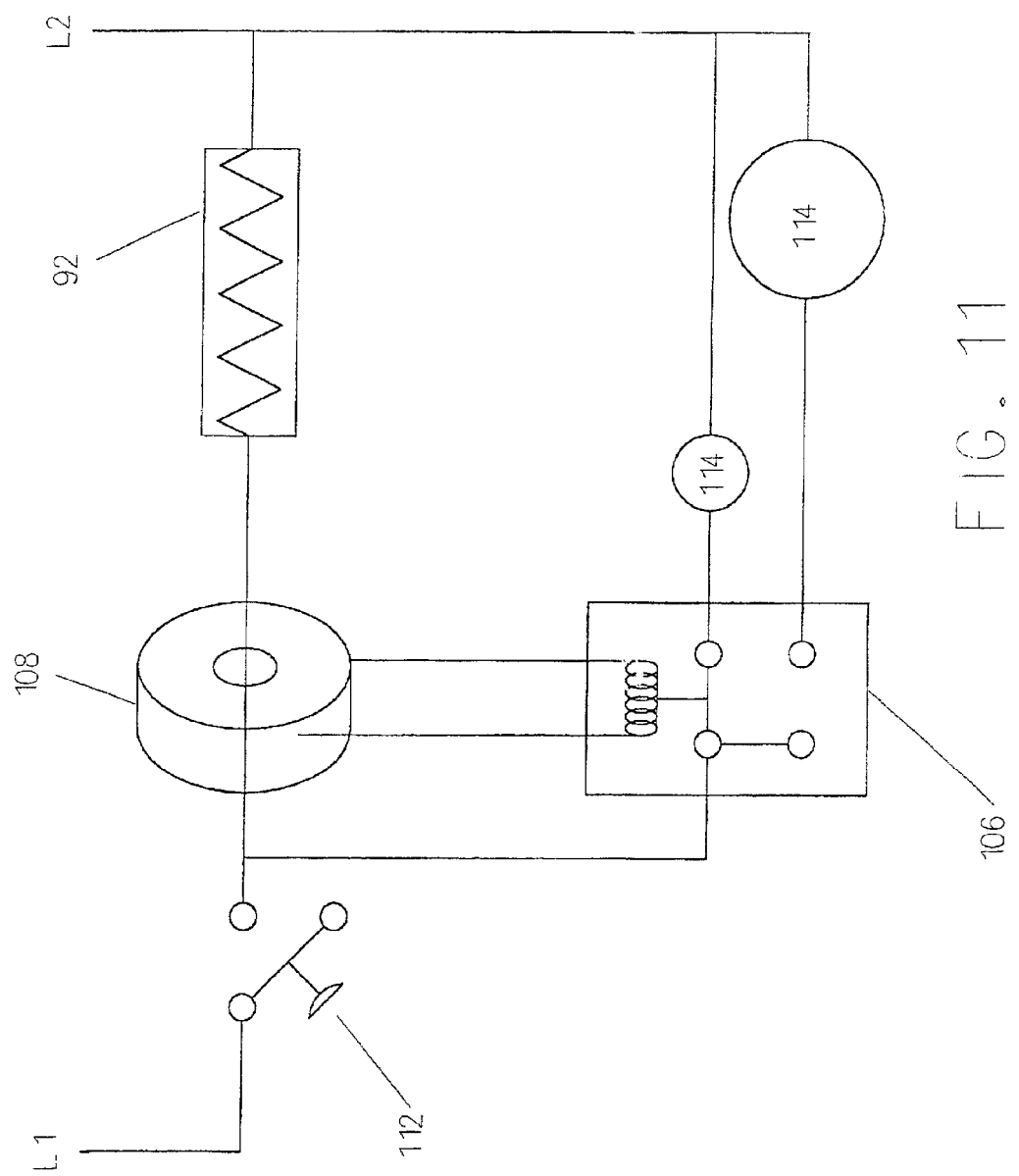
FIG. 11 is a schematic illustration of an electrical system contained within the staking apparatus of FIG. 1.

Referring to FIG. 5, a bottom cover 102 and top cover 29 are secured to first end plate 32, intermediate plate 34 and side plate 44, such that control system 30 is contained substantially therebetween. In a preferred embodiment, control system 30 includes a relay 106, a current transformer 108 and a terminal strip 110 that cooperatively control operation of heater 92. As illustrated in FIG. 11, a switch 112, which is preferably pneumatically actuated, is provided in a circuit that includes a power source, current transformer 108 and heater 92. Current transformer 108 is provided in electrical communication with relay 106, which is positioned in a second circuit that includes at least one signaling device 114, such as an indicator light or audible indicator.

In a preferred embodiment of the present invention, first and second extensible cylinders 36, 56 are pneumatically operated. Therefore, control system 30, as described herein, includes a means of distributing fluid power between a source of compressed air and first and second extensible cylinders 36, 56. However, it will be appreciated that other extensible devices, such as a motor driven screw mechanism, may be used in place of first and second extensible cylinders 36, 56 without departing from the scope of the present invention. In such a configuration, control system 30 may include specific devices, such as a programmable logic controller (PLC), for controlling operation of the extensible members.

Figure 9:
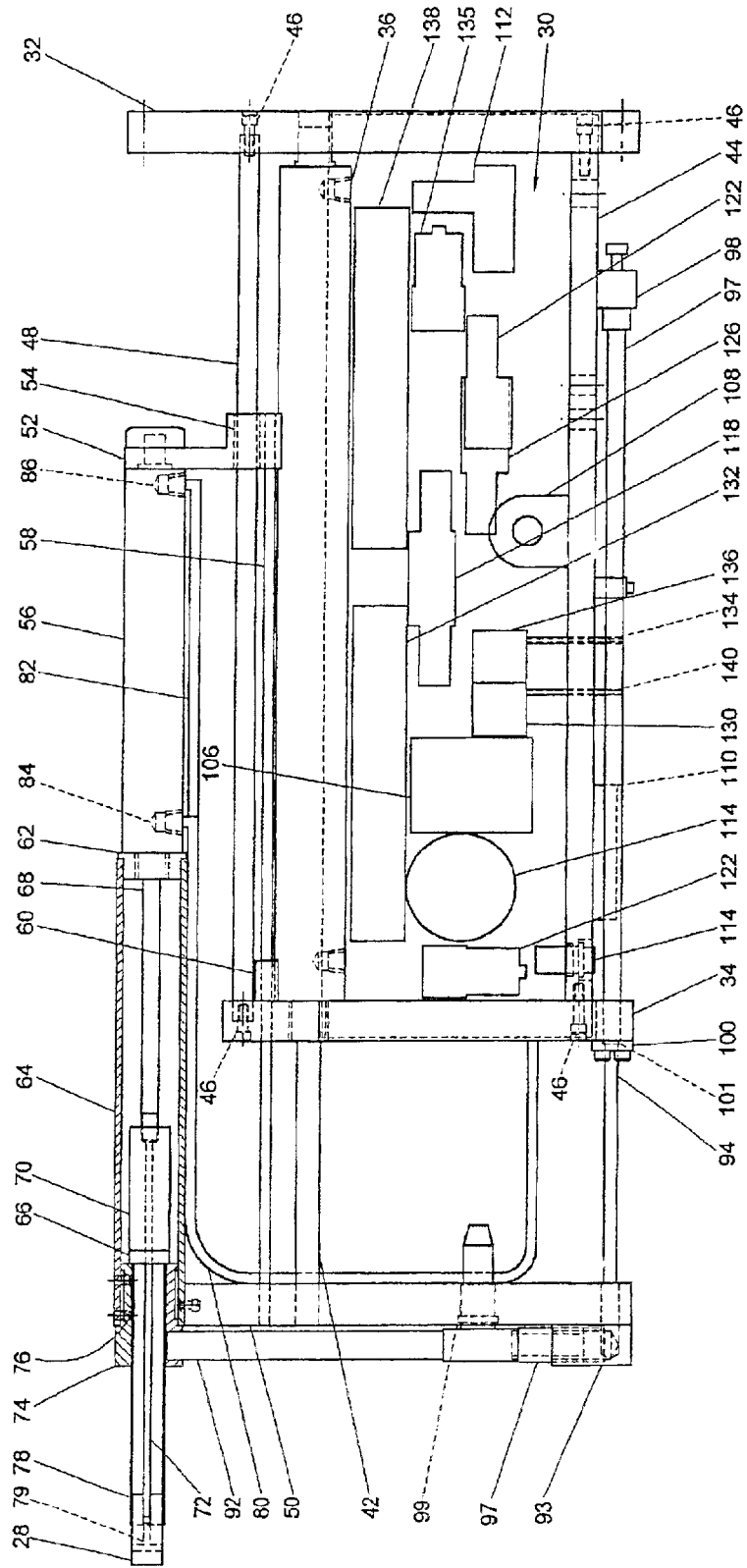
FIG. 9 is a plan view of the staking apparatus of FIG. 4 showing the first extensible member fully extended and a second extensible member fully extended.
Figure 10:
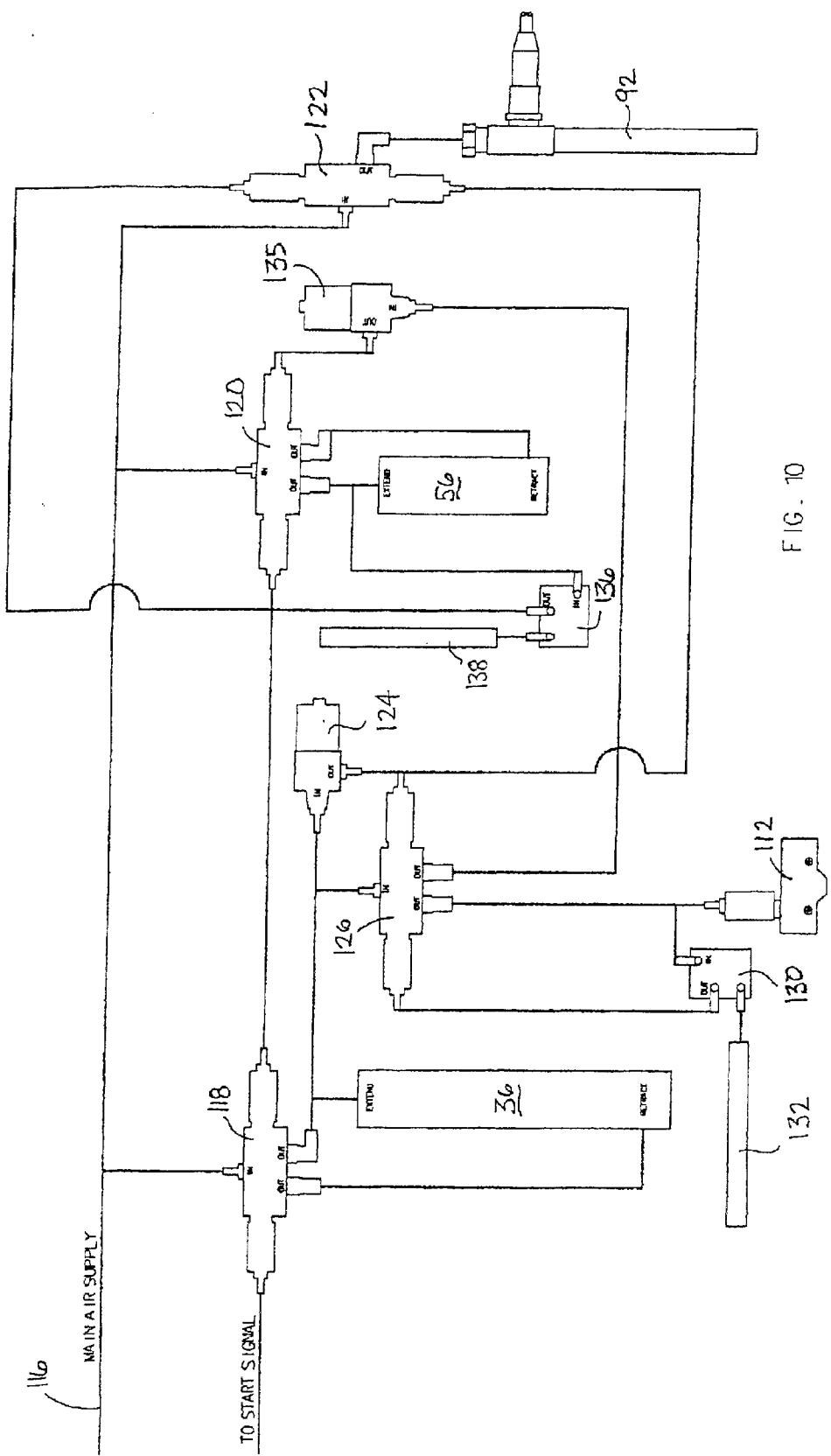
FIG. 10 is a schematic illustration of a valve arrangement contained within the staking apparatus of FIG. 1.

Referring to FIG. 10, staking apparatus 20 is provided with a main port 116 to which the source of compressed air is connected. Main port 116 is provided in direct communication with a pair of four-way valves 118, 120 and a two-way valve 122, which are preferably, but not necessarily, pneumatically operated to simplify operation of staking apparatus 20. For clarity, the conduits provided between port 116 and valves 118, 120 and 122 are not illustrated in FIGS. 4, 8 and 9, but are illustrated schematically in FIG. 10. Similarly, conduits provided between all pneumatically operated elements, as described herein, are not illustrated in FIGS. 4, 8 and 9, but are illustrated schematically in FIG. 10.

First four-way valve 118 is provided in communication with a first pulse valve 124 and a third four-way valve 126, both of which also being pneumatically operated. When actuated to a first position, third four-way valve 126 supplies air to a first timer 130, which is preferably pneumatically operated, and switch 112. First timer 130 is configured to supply air to a first volume chamber 132 until a first predetermined pressure in first volume chamber 132 is achieved, at which point timer 130 actuates or "shifts" to supply a signal or pulse of air to third four-way valve 126. The predetermined pressure that causes timer 130 to shift is selectively adjustable by an operator of staking apparatus 20 through an adjustment member 134, such as a screw, that extends through side plate 44 (FIGS. 4 and 5).

Referring still to FIG. 10, third four-way valve 126 can be actuated to a second position that supplies air to a second pulse valve 135, which in turn provides a signal to second four-way valve 120. When actuated to a first position, second four-way valve 120 supplies air to second extensible cylinder 56 causing it to extend. When shifted to a second position, second four-way valve 120 supplies air to a second timer 136 that is configured to supply air to a second volume chamber 138. Second timer 136 and second volume chamber 138 are preferably substantially similar to first timer 130 and first volume chamber 132. However, the predetermined pressure in second volume chamber 138 that causes timer 136 to shift is selectively adjustable by an operator of staking apparatus through an adjustment member 140, such as a screw, that extends through side plate 44 (FIGS. 4 and 5). Although the above described control system 30 is configured with pneumatically operated valves to distribute compressed air through control system 30, it is not necessarily limited thereto. Alternatively, other suitable air distribution devices, such as electromechanically operated valves, are also within the scope of this invention.

Figure 8:
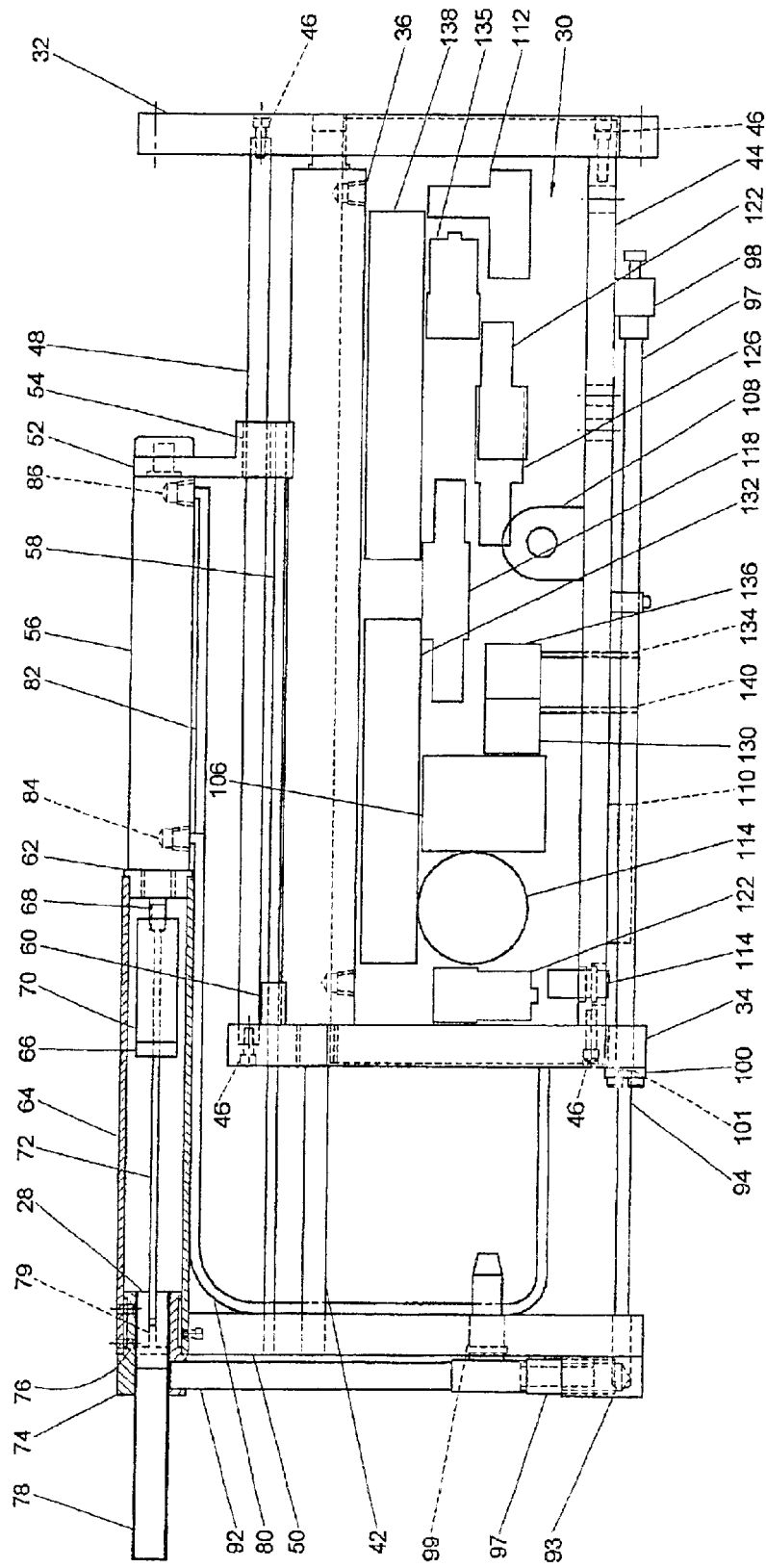
FIG. 8 is a plan view of the staking apparatus of FIG. 4 showing a first extensible member fully extended.

Operation of the inventive staking apparatus 20 will be described herein with reference to FIGS. 8 and 9. Provided a source of air and electricity are connected to staking apparatus 20, the operating sequence is initiated by an operator selectively supplying a signal or pulse of air to first four-way valve 118. The operator may initiate this pulse of air by simultaneously depressing a pair of pneumatically operated safety switches, or by any other suitable means known in the art.

Upon receipt of a signal or pulse of air, first four-way valve 118 shifts and supplies air to first extensible member 36, pulse valve 124, and third four-way valve 126. Regarding first extensible member 36, the receipt of air causes it to extended second end plate 50 away from intermediate plate 34, as illustrated in FIG. 8. As described above, the distance first extensible member 36 extends second end plate 50 is selectively variable by adjusting the position of collar 60 along tie rod 58. As shown in FIG. 8, extension of second extensible member 36 and second end plate 50 stops when collar 60 abuts intermediate plate 34.

Regarding third four-way valve 126, the receipt of air from first four-way valve 118 causes it to supply air to timer 130 and switch 112 virtually simultaneously. Upon receipt of air pressure, switch 112 shifts and supplies electricity to operate heater 92. Transformer 108 draws a small amount of current from a live wire between switch 112 and heater 92, which opens the normally closed relay 106. If a malfunction occurs in heater 92, such as a break in the internal heating coil, transformer 108 will not be able to draw current from the live wire. In his situation, relay 106 will not open, thereby completing the circuit that activates signaling device (s) 114 to warn the operator that beater 92 has malfunctioned.

Regarding pulse valve 124, the receipt of air from first four-way valve 118 causes it to send a pulse of air to two-way valve 122. This application of air pressure causes two-way valve 122 to shift and supply air through control valve 98, tubes 97 and 94, duct 96 in second end plate 50 and heater 92. The heated air that exits heater 92 is redirected through vent tube 78 and is expelled from vent tube 78 over stud 26, as shown in FIG. 1. Heated air is continuously expelled from vent tube 78 until timer 130 senses the predetermined air pressure in first volume chamber 132 and shifts.

Once shifted, timer 130 sends a pulse of air to third four-way valve 126 causing third four-way valve 126 to shift and turn off the air supply to switch 112 and timer 130. The shifting of third four-way valve 126 also causes it to supply air to actuate pulse valve 135. When actuated, pulse valve 135 sends a pulse of air to second four-way valve 120, causing it to shift and supply air to second extensible member 56 and timer 136. Receipt of air into second extensible member 56 causes it to extend staking tool 28 against stud 26 to form stud 26 over second workpeice 24, as shown in FIG. 2. The distance staking tool 28 extends into vent tube 78 is selectively adjustable to accommodate various studs 26 and workpieces 22, 24.

After termination of electricity to heater 92, non-heated air is continuously passing through heater 92 and is directed through duct 79 in staking tool 28 to cool staking tool 28 and the newly formed stud 26. The non-heated air passes through staking tool 28 until timer 136 senses the predetermined air pressure in second volume chamber 138 and shifts. Once shifted, timer 136 supplies a pulse of air to shift first and second four-way valves 118, 120 and two-way valve 122. Once sifted, first four-way valve 118 supplies air to first extensible member 52 causing it to retract second end plate 50 toward intermediate plate 34. Virtually simultaneously, the shifted second four-way valve 120 supplies air to second extensible member 56 causing it to retract staking tool 28 into vent tube 78. Once shifted, two-way valve 122 terminates the flow of air through heater 92. In this configuration, all items are returned to their home positions, as shown in FIG. 4, and the operating cycle is deemed complete.

Although certain preferred embodiments of the present invention have been described, the invention is not limited to the illustrations described and shown herein, which are deemed to be merely illustrative of the best modes of carrying out the invention. A person of ordinary skill in the art will realize that certain modifications and variations will come within the teachings of this invention and that such variations and modifications arc within its spirit and the scope as defined by the claims.

What is claimed is:

1. A staking apparatus, comprising:
a first end plate;
an intermediate plate spaced apart from the first end plate;
a first extensible member supported between the first end plate and the intermediate plate;
a second end plate extensible in relation to the intermediate plate by the first extensible member;
a second extensible member secured for movement with the second end plate;
a staking tool secured to the second extensible member for forming a workpiece;
a vent tube secured for movement with the second end plate, the vent tube configured to supply a flow of air to the workpiece and;
a control system positioned substantially between the first end plate and the intermediate plate.

2. The apparatus of claim 1, wherein the control system includes at least one inlet port for connecting the staking apparatus to a source of compressed air.

3. The apparatus of claim 2, wherein the control system includes at least one valve between the inlet port and the vent tube.

4. The apparatus of claim 2, further including a heater between the inlet port and the vent tube to selectively heat the air entering the vent tube.

5. The apparatus of claim 4, further including at least one signaling device to indicate abnormal operation of the heater.

6. The apparatus of claim 5, wherein the signaling device is an indicator light.

7. The apparatus of claim 6, wherein the signaling device is a sound generating device.

8. The apparatus of claim 1, wherein the first and second extensible members are pneumatic cylinders.

9. The apparatus of claim 8, wherein the control system includes at least one valve for selectively routing air between an inlet port and the first and second pneumatic cylinders.

10. The apparatus of claim 1, wherein the staking tool is extensible through the vent tube between a working position in which airflow through the vent tube is at least partially restricted and a storage position in which airflow through the vent tube is substantially unrestricted.

11. The apparatus of claim 1, wherein the vent tube supplies a relatively cool flow of air to the staking tool subsequent to forming the workpiece.

12. A staking apparatus for forming a workpiece, comprising:
   a first end plate;
      an intermediate plate aligned with and spaced apart from the first end plate;
      a first extensible member supported between the first end plate and the intermediate plate;
      a second end plate extensible in relation to the intermediate plate by the first extensible member;
      a second extensible member secured for movement with the second end plate;
      a vent tube secured for movement with the second end plate, the vent tube configured to supply a flow of air to the workpiece;
      a heater for heating the air supplied by the vent tube;
      a staking tool secured to the second extensible member, the staking tool extensible through the vent tube between a working position in which airflow through the vent tube is at least partially restricted and a storage position in which airflow through the vent tube is substantially unrestricted; and
      a control system for controlling operation of the staking apparatus.

13. The apparatus of claim 12, wherein the control system includes at least one inlet port for connecting the staking apparatus to a source of compressed air.

14. The apparatus of claim 13, wherein the control system includes at least one valve between the inlet port and the vent tube.

15. The apparatus of claim 13, wherein the heater is disposed between the inlet port and the vent tube to selectively heat the air entering the vent tube.

16. The apparatus of claim 12, wherein the first and second extensible members are pneumatic cylinders.

17. The apparatus of claim 16, wherein the control system includes at least one valve for selectively routing air between an inlet port and the first and the first and second pneumatic cylinders.

18. A staking apparatus, comprising:
   a first end plate;
   an intermediate plate spaced apart from the first end plate;
   a first extensible member supported between the first end plate and the intermediate plate;
   a second end plate extensible in relation to the intermediate plate by the first extensible member;
   a second extensible member secured for movement with the second end plate;
   a staking tool secured to the second extensible member for forming a workpiece;
   a vent tube secured for movement with the second end plate, the vent tube configured to supply a flow of air to the workpiece; and
   wherein the staking tool is extensible through the vent tube between a working position in which airflow through the vent tube is at least partially restricted and a storage position in which airflow through vent tube is substantially unrestricted.

* * * * *

UNITED STATES PATENT AND TRADEMARK OFFICE
CERTIFICATE OF CORRECTION

PATENT NO. : 6,840,755 B1
DATED : January 11, 2005
INVENTOR(S) : Lawrence J. Cook It is certified that error appears in the above-identified patent and that said Letters Patent is hereby corrected as shown below:

Column 6,
Line 55, change "The apparatus of claim 6" to -- The apparatus of claim 5 --.

Signed and Sealed this

Nineteenth Day of April, 2005

JON W. DUDAS
*Director of the United States Patent and Trademark Office*